United States Patent [19]
Hamada et al.

[11] Patent Number: 6,019,498
[45] Date of Patent: Feb. 1, 2000

[54] APPARATUS AND PROCESS FOR CONTINUOUSLY MIXING LIQUID WITH POWDER

[75] Inventors: Mitsuo Hamada; Makoto Kokubun; Atsushi Komatsu; Hideyuki Mori, all of Chiba Prefecture, Japan

[73] Assignee: Dow Corning Toray Silicone Co., Ltd., Tokyo, Japan

[21] Appl. No.: 09/106,251

[22] Filed: Jun. 29, 1998

[30] Foreign Application Priority Data

Jun. 30, 1997 [JP] Japan ............................. 9-189142

[51] Int. Cl.⁷ ............................................. B01F 7/26
[52] U.S. Cl. ..................... 366/178.1; 366/309; 366/315; 241/46.017; 241/46.08
[58] Field of Search ..................... 366/178.1, 165.3, 366/309, 312, 313, 314, 315, 317, 174.1, 302, 304; 241/46.017, 46.08

[56] References Cited

U.S. PATENT DOCUMENTS

| | | | |
|---|---|---|---|
| 2,639,901 | 5/1953 | Teale | 366/178.3 |
| 3,998,433 | 12/1976 | Iwako | 366/178.3 |
| 4,175,869 | 11/1979 | Churlaud | 366/309 |
| 4,175,873 | 11/1979 | Iwako et al. | 366/178.3 |
| 4,192,615 | 3/1980 | Fortunski et al. | 366/312 |
| 5,599,102 | 2/1997 | Hamada et al. | 366/178.1 |

FOREIGN PATENT DOCUMENTS

| | | | |
|---|---|---|---|
| 1 144 693 | 11/1955 | Germany | 366/315 |
| 2-2610 | 1/1990 | Japan . | |

*Primary Examiner*—Tony G. Soohoo
*Attorney, Agent, or Firm*—Jennifer S. Warren; William F. Boley

[57] ABSTRACT

Apparatus and process for continuously mixing liquid with powder, where the process uses an apparatus having a feed port for the introduction of liquid and powder on the top of a casing, a discharge outlet at the bottom of the casing, a rotating disk within the casing that divides the interior of the casing into upper and lower mixing compartments, scrapers on the upper surface of the rotating disk, and a rotating scraper positioned below the rotating disk that rotates independent from and without contacting the rotating disk.

8 Claims, 2 Drawing Sheets

APPARATUS AND PROCESS FOR CONTINUOUSLY MIXING LIQUID WITH POWDER

FIELD OF THE INVENTION

This invention is an apparatus and process for continuously mixing liquid with powder. More specifically, this invention is an apparatus for continuously mixing liquid and powder (hereinafter referred to as a continuous liquid-powder mixer) that generates little shear-induced heat during the continuous mixing of liquid with powder, and that is particularly well-suited for the preparation of compositions comprising the blend of particulate filler in a fluid polymer, such as a fluid silicone polymer or fluid organic polymer. The invention is also a process for continuously mixing liquid and powder using this continuous mixer.

BACKGROUND OF THE INVENTION

Liquid silicone rubber compositions are employed in molding applications such as injection molding, compression molding, and the like, and are also used in various other applications as adhesives, mold-making materials, sealants, coatings, etc. These liquid silicone rubber compositions are viscous mixtures of crosslinkable liquid silicone polymer, e.g., organopolysiloxane, with a particulate filler, e.g., reinforcing silica. In some cases the compositions prepared for use in the above-mentioned applications have high apparent viscosities due to high filler loadings, or because the filler has a strong capacity to raise the viscosity. It is desirable in the preparation of these high apparent viscosity liquid silicone rubber compositions to carry out mixing so as to obtain the best possible dispersion of the particulate filler being blended into the liquid silicone polymer. Compact apparatuses that efficiently mix liquid and powder are disclosed in Japanese Patent Publication Numbers 53-38828 and 2-2610. These are continuous mixers that contain a rotating disk installed within a casing so as to divide the interior of the casing into upper and lower mixing compartments. Scrapers are also provided on the upper, lower, and side surfaces of the rotating disk in these mixers. However, at high compounding ratios for microparticulate fillers such as fumed silica or carbon black, i.e., at compounding ratios as high as approximately 20%, the mixture takes on a high apparent viscosity and a substantial increase in shear-induced heat generation occurs in the mixers described above. Blending beyond this point is highly problematic, and it also becomes next to impossible to intermix additional ingredients, especially curing agents, without cooling the product mixture. In addition, when the powder is a property-rich metal powder flake such as silver powder, or a metal powder with a low melting or softening point, the metal powder will aggregate and become unusable from a practical standpoint.

The object of the present invention is to provide a liquid-powder continuous mixer and continuous mixing process that generate little shear-induced heating during liquid-powder intermixing even when large amounts of powder are being mixed into the liquid or when a powder is being intermixed that has a strong thickening capacity.

SUMMARY OF THE INVENTION

The present invention is an apparatus for continuously mixing liquid with powder, comprising a feed port for the introduction of liquid and powder on the top of a casing, a discharge outlet at the bottom of said casing, a rotating disk within the casing that divides the interior of the said casing into upper and lower mixing compartments, scrapers on the upper surface of said rotating disk, and a rotating scraper that is provided in a position below the rotating disk and that rotates independently from and without contacting the said rotating disk. The invention is also a process for continuously mixing liquid with powder comprising:

continuously introducing liquid and powder into the feed port of the continuous mixing apparatus, mixing the liquid and powder by rotation of the rotating disk,
where the mixture transferred into the lower mixing compartment is mixed and scraped off through the action of the rotating scraper, and the rotating scraper is rotated at a lower rate than the said rotating disk, and continuously discharging the mixture from the system through the discharge outlet.

EXPLANATION OF THE REFERENCE NUMBERS

Figure 1:
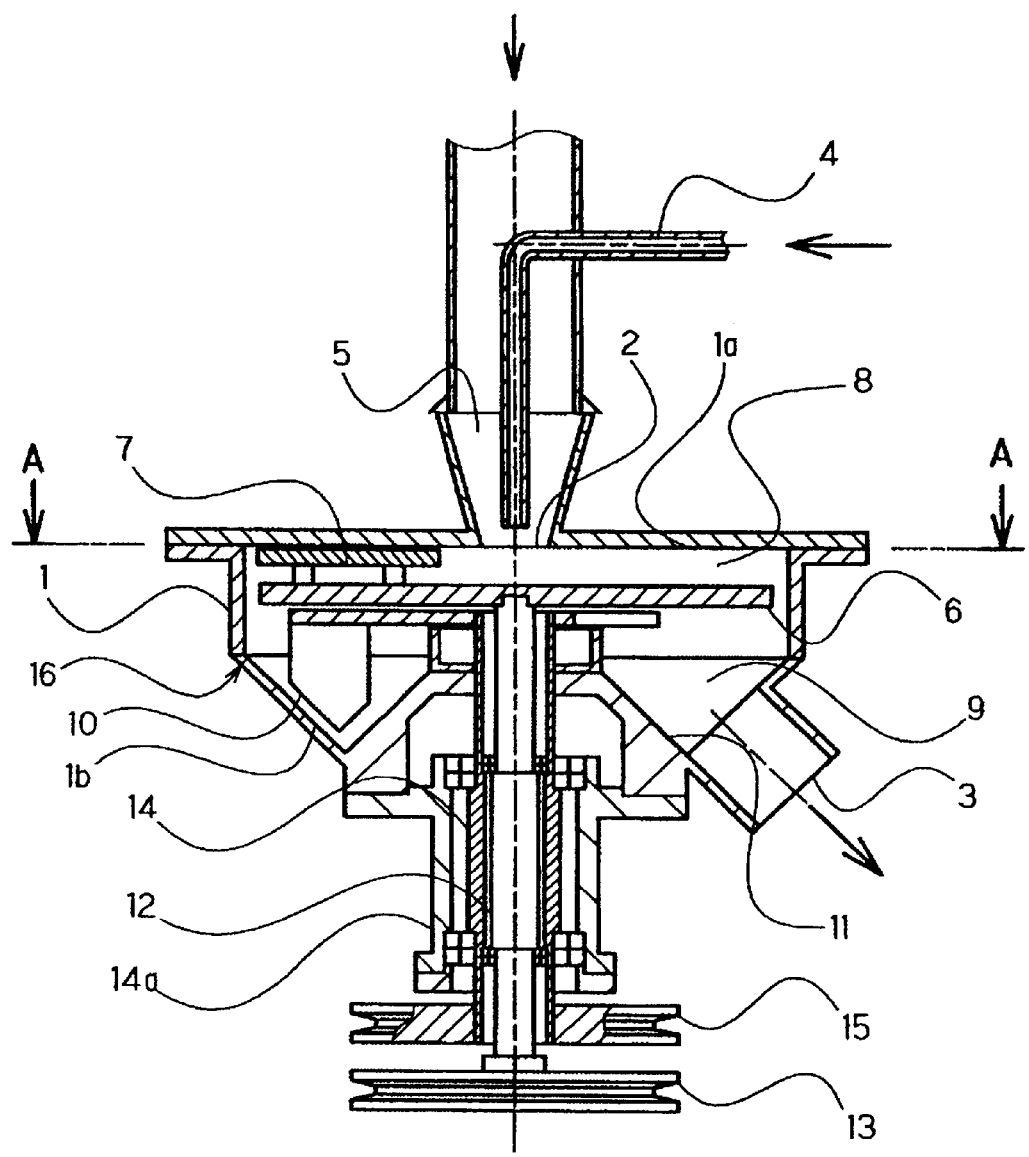
FIG. 1 contains a longitudinal cross section of a continuous mixing apparatus that is an example of the present invention.

1 . . . casing
2 . . . feed port
3 . . . discharge outlet
4 . . . liquid supply conduit
5 . . . powder supply conduit
6 . . . rotating disk
7 . . . scraper
8 . . . upper mixing compartment
9 . . . lower mixing compartment
10 . . . rotating scraper
11 . . . conical element
12 . . . rotating axle
13 . . . pulley
14 . . . rotating axle
15 . . . pulley
16 . . . body of the continuous mixing apparatus

DETAILED DESCRIPTION OF THE INVENTION

The continuous mixer of the present invention as described above restrains shear-induced heat generation and thereby affords a substantial reduction in the temperature of the mixture that is discharged to the exterior. This is achieved in the continuous mixer of the present invention through partition of the casing interior by the rotating disk, thus installing within the lower mixing compartment a rotating scraper that rotates independently from and without contacting the rotating disk. Rotation of the rotating scraper at a lower rotation rate than the rotating disk then attenuates shear-induced heat generation and results in substantially lowered temperature of the mixture at discharge. The continuous mixing process of the present invention also restrains shear-induced heat generation during the mixing of a liquid and powder and thereby affords a major reduction in the temperature of the mixture that is discharged to the exterior. The present invention has the following advantages: the time and energy required to cool the product mixture can be reduced; the crosslinker, curing catalyst, and volatile additives can be admixed either without cooling the product mixture or after only minor cooling of the product mixture; and even powders with low melting points or softening points can be intermixed without agglomeration or melting.

In the continuous mixer described above, the liquid and powder introduced into the upper mixing compartment are subjected to a first mixing effect by the upper surface of the rotating disk, are transferred into the lower mixing compartment by the centrifugal force of rotation and by the action of the scrapers provided on the upper surface of the rotating disk, and are subjected to a second mixing effect from the rotating scraper that is rotating independently from and without contacting the rotating disk. The resulting mixture is transported to the discharge outlet by the centrifugal force from rotation and the action of the rotating scraper. Shear heating of the liquid-powder mixture can be kept low because the rotating scraper provided in the lower position is rotated at a lower rotation rate than the rotating disk provided in the upper position.

Liquids that can be supplied to the continuous mixer and continuous mixing process according to the present invention can be exemplified by water, the Japanese starch-based liquid candy known as "mizuame", edible oils, mineral oils, liquid chemical compounds, liquid polymers, and so forth. The liquid polymers can be exemplified by liquid silicone polymers and specifically organopolysiloxanes, and by liquid polybutenes, liquid polyisobutylenes, liquid epoxy resins, liquid polyurethanes, liquid polyethers, and so forth. These liquid polymers may or may not be crosslinkable. The powders are exemplified by wheat flour, buckwheat flour, starch powders, fish powders, wood powders, cement, crushed rock, metal powders, powder fillers, pigments, and so forth, and the powder fillers are themselves specifically exemplified by fumed silica, wet-process silica, diatomaceous earth, calcium carbonate powder, carbon black, aluminum hydroxide powder, alumina powder, and silver powder. One or more types of powder can be used and one or more types of liquid can be used.

The continuous mixing apparatus and process according to the present invention can be effectively used for the preparation of curable liquid polymer compositions, and particularly curable liquid rubber compositions, whose preparation entails the blending of microparticulate filler into a viscous fluid whose viscosity will be raised further by the admixture of the filler, and particularly into liquid polymers such as liquid silicone polymers. The present invention will be specifically explained below with reference to the drawings. FIG. 1 contains a cross section of a continuous mixer that is an example of the present invention, while FIG. 2 contains a cross section along the A—A line viewed in the direction of the arrows.

Figure 2:
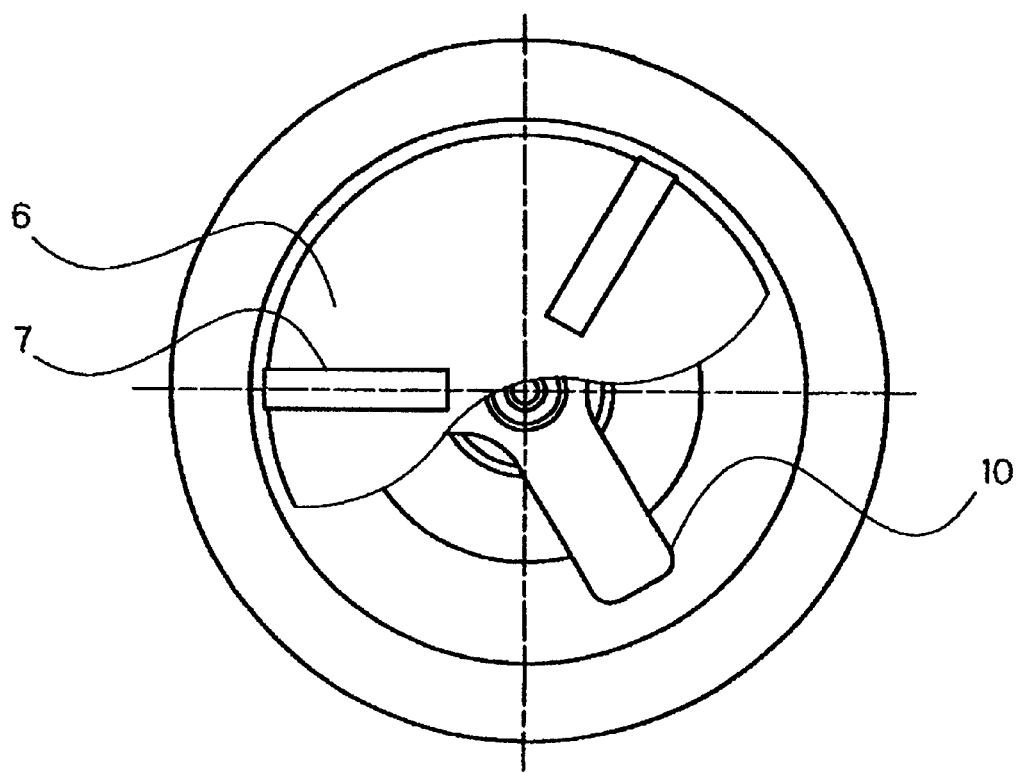
FIG. 2 contains a view along the arrows at the A—A level in FIG. 1.

In FIGS. 1 and 2, 16 refers to the body of the continuous mixing apparatus. A cylindrical casing 1 forms the outer shell of the body 16 of the continuous mnixer, and a feed port 2 that receives liquid and powder is provided at the center of an upper plate 1a of this casing. The lower part of the casing forms an inclined surface 1b having the shape of an inverted cone, and a discharge outlet 3 is provided in said inclined surface 1b. Although this is not shown in the figures, a separate feed port may be present in the side surface of the casing for the introduction of liquid additives. A conical element 11 is provided at the center of the bottom of the body 16 of the continuous mixer so as to form an annular V-shaped bottom with the inclined surface 1b. The lower end of the powder supply conduit 5 merges into a feed port 2 provided in the body 16 of the continuous mixer, while the lower end of a liquid supply conduit 4 faces this feed port 2. The liquid supply conduit 4 also penetrates into and runs through the interior of the powder supply conduit 5. Liquid is fed into the feed port 2 from the liquid supply conduit 4 and powder is fed into the feed port 2 from the powder supply conduit 5.

A rotating disk 6 is installed horizontally within the casing 1 of the body 16 of the continuous mixer so as to face the feed port 2. This rotating disk 6 divides the interior of the casing 1 into an upper mixing compartment 8, where a first-stage mixing is carried out, and a lower mixing compartment 9, where a second-stage mixing is carried out. The center of rotation of this rotating disk 6 is fixed on the upper end of a rotating axle 12. Said rotating axle 12 is supported in the inner wall of a rotating axle 14 and extends to the exterior of the casing. A pulley 13 is fixed at the bottom end of the rotating axle 12, and power for rotation is input from a motor (not shown) across this pulley 13. The preferred range for the rotation rate of the rotating axle 12 is from 200 to 4,000 rpm. The upper surface of the rotating disk 6 carries three scrapers 7 separated by equal angles. The scraper count need not necessarily be the 3 shown in the figure, and any number of scrapers can be provided so long as at least 1 scraper is present. The individual scrapers may also have different sizes and different shapes from the other scrapers. These scrapers 7 function to both mix and scrape off the liquid-powder mixture adhering on the lower surface of the upper plate 1a. In addition, the side surface of the rotating disk 6 may as desired be provided with from 1 to 6 scrapers.

A rotating scraper 10 is provided in a position below the rotating disk 6. This rotating scraper 10 is provided in such a manner that it rotates independently from and without contacting the said rotating disk 6. Scraper elements extend downward from the rotating scraper 10. Because these scraper elements rotate along the inclined surface 1b, they function to scrape off mixture sticking on the inclined surface 1b at the bottom of the casing, to mix the mixture, and to discharge the mixture through the discharge outlet 3. The rotating scraper 10 is provided with 3 scraping elements which extend horizontally in three directions from the center of rotation of the rotating scraper 10 and which are separated from each other by equal angles. The outside edge of each scraping element sweeps along the inclined surface 1b. While FIG. 2 shows the scraping elements as extending in 3 directions, as long as the scraping elements are separated by equal angles they may extend in, for example, 2, 4, or 6 directions. The center of rotation of the rotating scraper 10 is attached to the upper end of a rotating axle 14. The rotating axle 14 is supported by a bearing 14a and extends to the exterior of the casing 1. A pulley 15 is attached to the lower end of this rotating axle 14, and power for rotation is applied from a motor (not shown in figure) across this pulley 15. In order to restrain shear-induced heat generation, the rotation rate of the rotating scraper 10 is preferably from 5% to 95% of the rotation rate of the rotating disk 6.

In the continuous mixer as described above, due to the installation of the rotating scraper 10 that rotates independently from and without contacting the rotating disk 6, the liquid and powder that have flowed down into the upper mixing compartment 8 from the feed port 2 are subjected to a first mixing operation by the centrifugal force of the rotating disk 6 and the scraping action of the scrapers 7 and at the same time are transported radially outward on the rotating disk 6. The mixture that has been subjected to the first mixing operation drains down onto the inclined surface 1b from the outer edge of the rotating disk 6 and is scraped, mixed, and discharged to the exterior through discharge outlet 3 by the action of the scraping elements that extend downward from the rotating scraper 10. The rotating scraper 10 is run in this mixing operation at a rotation rate lower than that of the rotating disk 6. Accordingly, the temperature of the mixture discharged from the system is kept low in the subject continuous mixing apparatus because the mixture receives little shearing action from the scrapers responsible for discharge from the mixer. This temperature restraint occurs even when filler is being blended into the liquid at high loadings or when a filler with a strong tendency to raise the viscosity is being blended into the liquid.

EXAMPLES

Liquid silicone rubber bases were prepared by blending 20 parts hydrophobic fumed silica with a specific surface area of 110 $m^2/g$ (trade name: Aerosil R-972, from Nippon Aerosil Company, Limited) into 100 parts vinyl-terminated dimethylpolysiloxane with a viscosity of 40,000 centipoise at room temperature. These bases were prepared using a continuous mixer and continuous mixing conditions according to the present invention as reported below and using a comparative continuous mixer and mixing conditions also as reported below. The discharge temperatures of the two liquid silicone rubber base products were measured at the discharge outlet 3 using a thermocouple thermometer. The results are reported in Table 1.

The obtained results show that the continuous mixing apparatus and process of the present invention provide a lower temperature for a mixture at discharge than the comparative continuous mixing apparatus and process.

Apparatu Example 1

Structure: as shown in FIGS. 1 and 2
Diameter of the rotating disk 6: 300 mm
RPM of the rotating disk 6: 1,000 rpm
RPM of the rotating scraper 10: 200 rpm
Feed method: The 20 weight parts hydrophobic fumed silica was fed through the powder supply conduit 5, and the 100 weight parts vinyl-terminated dimethylpolysiloxane was fed through the liquid supply conduit 4.

Comparative Example

Structure: The continuous mixing apparatus shown in FIGS. 1 and 2 was modified by omitting the rotating scraper 10 and attaching scrapers on the lower surface of the rotating disk 6.
Diameter of the rotating disk 6: 300 mm
RPM of the rotating disk 6: 900 rpm
Feed method: Same as for the continuous mixing apparatus according to the present invention.

TABLE 1

Discharge Temperature from Mixer

|  | temperature at discharge (° C.) |
|---|---|
| continuous mixing apparatus of the present invention | 60 |
| comparative continuous mixing appratus | 105 |

We claim:

1. An apparatus for continuously mixing liquid with powder comprising a casing having a top with an inner surface and a bottom having an inclined inner surface, a feed port for the introduction of liquid and powder in the top of the casing, a discharge outlet at the bottom of the casing, a rotating axle having an upper end and a lower end within the casing, a rotating disk fixed on the upper end of the rotating axle within the casing that divides the interior of the casing into upper and lower mixing compartments, a scraper on the upper surface of the rotating disk positioned in the upper mixing compartment to scrape the inner surface of the casing tops, and a rotating scraper positioned below the rotating disk in the lower mixing compartment and that rotates independently from and without contacting the rotating disk to scrape the inclined surface of the casing bottom.

2. The continuous mixing apparatus according to claim 1, further comprising a liquid supply conduit having a terminus and a powder supply conduit, having a terminus, where the terminus of a liquid supply conduit and the terminus of a powder supply conduit face the feed port on the top of the casing.

3. The continuous mixing apparatus according to claim 2, where the powder supply conduit merges into the feed port and the liquid supply conduit is located within the powder supply conduit.

4. The continuous apparatus of claim 1 where the number of scrapers on the upper surface of the rotating disk is 3.

5. The continuous mixing apparatus of claim 1 further comprising 1 to 6 scrapers provided on the side surface of the rotating disk.

6. Process for continuously mixing liquid with powder that comprising:

continuously introducing liquid and powder into the feed port of the continuous mixing apparatus of claim 1, mixing the liquid and powder by rotation of the rotating disk, where the mixture transferred into the lower mixing compartment is mixed and scraped off through the action of the rotating scraper, and the rotating scraper is rotated at a lower rate than the said rotating disk, and continuously discharging the mixture from the system through the discharge outlet.

7. A process according to claim 6 where the rotating axle of the continuous mixing apparatus rotates at a rate in the range of about 200 rpm to 4000 rpm.

8. A process according to claim 6, where the rotating scraper rotates at a rotation rate about 5% to about 95% the rotation rate of the rotating disk.

* * * * *